A. C. BLAKE.
NUT LOCK.
APPLICATION FILED JAN. 24, 1919.

1,339,015.

Patented May 4, 1920.

Inventor
Albert C. Blake.

UNITED STATES PATENT OFFICE.

ALBERT C. BLAKE, OF BUFFALO, NEW YORK.

NUT-LOCK.

1,339,015.    Specification of Letters Patent.    Patented May 4, 1920.

Application filed January 24, 1919. Serial No. 272,903.

*To all whom it may concern:*

Be it known that I, ALBERT C. BLAKE, citizen of the United States, residing at Buffalo, in the county of Erie and State of New York, have invented certain new and useful Improvements in Nut-Locks, of which the following is a specification.

This invention relates to an improved nut lock and has as its primary object to provide a simple and effective device of this character for positively locking the nut against accidental displacement from the bolt therefor.

The invention has as a further object to provide a construction wherein, while the nut will be normally locked against rotation upon the bolt, the locking member employed may, nevertheless, be readily displaced, so that the nut may be adjusted.

And the invention has as a still further object to provide a construction wherein the locking member for the nut will, itself, be locked upon the bolt coacting therewith and with the nut for locking the nut.

Other and incidental objects will appear during the course of the detailed description of the invention. In the drawings, wherein I have illustrated the preferred embodiment of the invention, and wherein similar reference characters designate corresponding parts throughout the several views.

Figure 1:
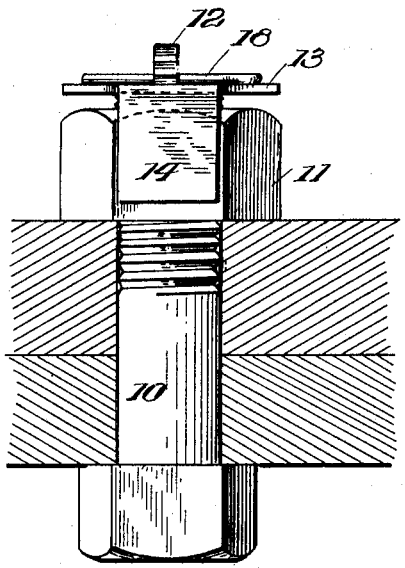
Figure 1 is a side elevation of my improved nut lock.
Figure 2:
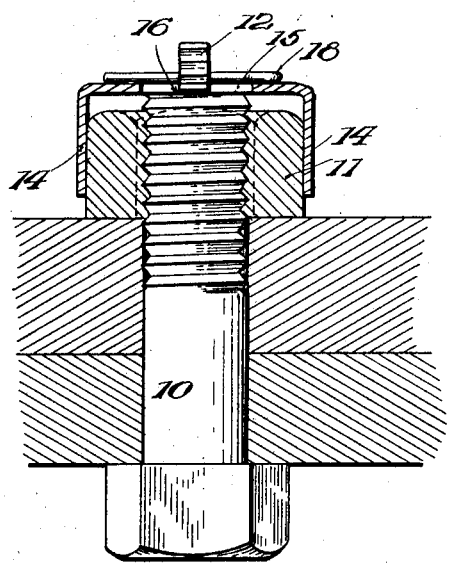
Fig. 2 is a view similar to Fig. 1 but with the nut and locking member shown in section, this view also illustrating the locking member in a different position with respect to the bolt from that shown in Fig. 1.
Figure 3:
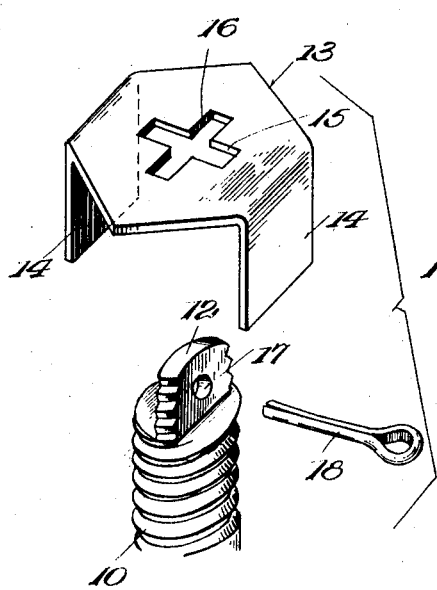
Fig. 3 is a fragmentary perspective view showing the threaded end of the bolt and locking member in detail.

Referring now more particularly to the drawings, I employ, in carrying out my invention, a bolt 10 provided at one end with the usual head and threaded at its opposite end to removably receive a nut 11. As illustrated in the drawings, a hexagonal nut is preferably employed. Formed on the threaded end of the bolt is a reduced extension or terminal 12 which is provided with flat sides and is threaded at its edges to receive the nut thereover. Normally coöperating with this terminal is a locking member or plate 13. This locking member is preferably struck from a piece of suitable resilient sheet metal and is provided with a pair of oppositely disposed depending lugs 14. Formed centrally in the body of the locking member is a cruciform opening which is defined by slots 15 and 16 intersecting each other at substantially right angles. Each of these slots is adapted to freely receive the terminal 12 of the bolt so that the device may thus be fitted upon the bolt to receive said terminal through either of said slots when the locking member will rest against the upper end of the bolt, as shown in Figs. 1 and 2, while the lugs 14 will engage opposite flat faces of the nut 11. Consequently, as will be seen, the locking member will coact with the bolt terminal and with the nut for securely locking the nut against rotation. Formed through the terminal 12 is an opening 17 and normally fitting through this opening is a key 18 overlying the locking member and locking this member against accidental displacement from the bolt. A secure and efficient nut lock is thus provided.

Attention is now directed to the fact that the nut 11 may be locked in adjusted position upon the bolt at each twelfth of a revolution. This is made possible by employing a hexagonal nut and providing the intersecting slots 15 and 16 in the locking member. In Fig. 1, the locking member is positioned upon the bolt receiving the terminal 12 through the slot 15, a pair of oppositely disposed flat faces of the nut alining with the side edges of said terminal so as to be engaged by the lugs 14 of said member. In Fig. 2, the nut is shown rotated clockwise a twelfth of a revolution from the position illustrated in Fig. 1. Opposite flat faces of the nut lying respectively at the left and right of the pair of faces shown engaged in Fig. 1, are thus brought into alinement with the side faces of the terminal 12. Consequently, by fitting the locking member over said terminal to engage the terminal through the slot 16 of said member, as shown in this figure, the lugs 14 will engage the flat faces of the nut alined with the side faces of the terminal for locking the nut against rotation. It will thus be seen that by shifting the locking member in its position with respect to the terminal of the bolt the nut may be locked, in the manner just described, at each twelfth of a revolution. Consequently, after turning the nut to engage the work, but slight adjustment of the nut, if any, will be required in order that the locking member may be applied. In this connection, it will, of course, be understood that while in the present instance I have shown the use of a hexagonal nut still, I do not wish to be limited in this regard as the flat inner faces of the lugs 14 are adapted to engage either square or polygonal sided nuts with equal efficiency.

Having thus described the invention, what is claimed as new is:

The combination with a bolt having a reduced axial screw threaded stud, of a nut threaded on said bolt, a locking device including a flat body plate having intersecting slots disposed at right angles to each other and receiving said axial stud, the opposite sides of said body plate being provided with depending flat lugs adapted to flatly engage the sides of the nut for locking the nut in position, said reduced axial stud being provided with a transverse opening, and a locking pin extending through said transverse opening and engaged with the body plate of said locking device.

In testimony whereof I affix my signature.

ALBERT C. BLAKE. [L. S.]